United States Patent

Guarino

[11] Patent Number: 5,713,560
[45] Date of Patent: Feb. 3, 1998

[54] HYDRAULIC JACK FOR VEHICLE

[76] Inventor: Jacob David Guarino, 84 Spar Dr., Mastic Beach, N.Y. 11951

[21] Appl. No.: 656,825

[22] Filed: Jun. 3, 1996

[51] Int. Cl.$^6$ .................................. B60S 9/02
[52] U.S. Cl. .................................. 254/423
[58] Field of Search ................. 254/423, 93 R, 254/93 H, 45

[56] References Cited

U.S. PATENT DOCUMENTS

| | | | |
|---|---|---|---|
| 1,583,189 | 5/1926 | Scott | 254/423 |
| 1,972,552 | 9/1934 | Donovan | 254/423 |
| 2,056,954 | 10/1936 | Bryant | 254/423 |
| 2,060,344 | 11/1936 | Perkins | 254/423 |
| 2,600,750 | 6/1952 | Gaudet et al. | 254/423 |

*Primary Examiner*—Robert C. Watson

[57] ABSTRACT

A new and improved hydraulic jack system operable from the dashboard of an automobile. The system is for use in raising the front right, front left, rear right or rear left portions of an automobile by way of the front or rear axles. The system achieves this through the use of four separate hydraulic jacks, two positioned at either end of the front axle and two positioned at either end of the rear axle. With the system of the present invention a user can raise a single portion of the automobile (eg the front right or front left) or all portions simultaneously.

1 Claim, 3 Drawing Sheets

HYDRAULIC JACK FOR VEHICLE

BACKGROUND OF THE INVENTION

1. Field of the Invention

The present invention relates to hydraulic jack for vehicle and more particularly pertains to a self contained vehicle jack.

2. Description of the Prior Art

The use of vehicle jacks is known in the prior art. More specifically, vehicle jacks heretofore devised and utilized for the purpose of lifting vehicles are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 5,224,688 to Torres et al a self-contained vehicle lift system. Furthermore, U.S. Pat. No. 3,606,248 to Goldfarb; U.S. Pat. No. 3,614,064 to Bennett; U.S. Pat. No. 5,348,330 to Few et al; U.S. Pat. No. 4,623,125 to Ebey; and U.S. Pat. No. 4,084,789 to Francis all illustrate various vehicle jacks or lifting devices.

In this respect, the hydraulic jack for vehicle according to the present invention substantially departs from the conventional concepts and designs of the prior art, and in doing so provides an apparatus primarily developed for the purpose of selectively lifting portions of a vehicle from its axles.

Therefore, it can be appreciated that there exists a continuing need for new and improved hydraulic jack for vehicle which can be used for lifting portions of a vehicle from its axles. In this regard, the present invention substantially fulfills this need.

SUMMARY OF THE INVENTION

In view of the foregoing disadvantages inherent in the known types of vehicle jacks now present in the prior art, the present invention provides an improved hydraulic jack for vehicle. As such, the general purpose of the present invention, which will be described subsequently in greater detail, is to provide a new and improved hydraulic jack for vehicle and method which has all the advantages of the prior art and none of the disadvantages.

To attain this, the present invention essentially comprises a hydraulic jack system operable from the dashboard of an automobile, the system for use in raising the front right, front left, rear right and rear left portions of an automobile by way of the front axle and rear axle, the system comprises in combination the following elements. A front right jack defined by a cylinder having an interior portion and an exterior surface, a hydraulic port and associated hydraulic line positioned within the cylinder, two mounting posts positioned upon the exterior surface of the cylinder, a selectively engagable detent positioned within the interior portion of the cylinder, the front right jack further defined by a piston having an upper extent and a lower extent and an intermediate extent therebetween, a pad positioned upon the lower extent of the piston and adapted for engagement with the ground, a number of recesses formed along the intermediate extent of the piston and adapted to be engaged by the detent, the detent and recesses together functioning to selectively permit or restrict the motion of the piston with respect to the cylinder, the front right jack positioned adjacent the front right portion of the automobile upon the front axle, the front right jack being positioned by way of the two mounting posts. A front left jack defined by a cylinder having an interior portion and an exterior surface, a hydraulic port and associated hydraulic line positioned within the cylinder, two mounting posts positioned upon the exterior surface of the cylinder, a selectively engagable detent positioned within the interior portion of the cylinder, the front left jack further defined by a piston having an upper extent and a lower extent and an intermediate extent therebetween, a pad positioned upon the lower extent of the piston and adapted for engagement with the ground, a number of recesses formed along the intermediate extent of the piston and adapted to be engaged by the detent, the detent and recesses together functioning to selectively permit or restrict the motion of the piston with respect to the cylinder, the front left jack positioned adjacent the front left portion of the automobile upon the front axle, the front left jack being positioned by way of the two mounting posts. A rear right jack defined by a cylinder having an interior portion and an exterior surface, a hydraulic port and associated hydraulic line positioned within the cylinder, two mounting posts positioned upon the exterior surface of the cylinder, a selectively engagable detent positioned within the interior portion of the cylinder, the rear right jack further defined by a piston having an upper extent and a lower extent and an intermediate extent therebetween, a pad positioned upon the lower extent of the piston and adapted for engagement with the ground, a number of recesses formed along the intermediate extent of the piston and adapted to be engaged by the detent, the detent and recesses together functioning to selectively permit or restrict the motion of the piston with respect to the cylinder, the rear right jack positioned adjacent the rear right portion of the automobile upon the rear axle, the rear right jack being positioned by way of the two mounting posts. A rear left jack defined by a cylinder having an interior portion and an exterior surface, a hydraulic port and associated hydraulic line positioned within the cylinder, two mounting posts positioned upon the exterior surface of the cylinder, a selectively engagable detent positioned within the interior portion of the cylinder, the rear left jack further defined by a piston having an upper extent and a lower extent and an intermediate extent therebetween, a pad positioned upon the lower extent of the piston and adapted for engagement with the ground, a number of recesses formed along the intermediate extent of the piston and adapted to be engaged by the detent, the detent and recesses together functioning to selectively permit or restrict the motion of the piston with respect to the cylinder, the rear left jack positioned adjacent the rear left portion of the automobile upon the rear axle, the rear left jack being positioned by way of the two mounting posts. A control panel positioned upon the dashboard of the automobile, the control panel functioning to control the application of hydraulic fluid to the front right jack, front left jack, rear right jack and rear left jack.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved hydraulic jack for vehicle which have all the advantages of the prior art vehicle jacks and none of the disadvantages.

It is another object of the present invention to provide new and improved hydraulic jack for vehicle which may be easily and efficiently manufactured and marketed.

It is further object of the present invention to provide new and improved hydraulic jack for vehicle which are of durable and reliable constructions.

An even further object of the present invention is to provide new and improved hydraulic jack for vehicle which are susceptible of a low cost of manufacture with regard to both materials and labor, and which accordingly are then susceptible of low prices of sale to the consuming public, thereby making such hydraulic jack for vehicle economically available to the buying public.

Still yet another object of the present invention is to provide new and improved hydraulic jack for vehicle which provide in the apparatuses and methods of the prior art some of the advantages thereof, while simultaneously overcoming some of the disadvantages normally associated therewith.

Even still another object of the present invention is to enable lifting of the portions of a vehicle by way of its axles.

Lastly, it is an object of the present invention to provide new and improved hydraulic jack system operable from the dashboard of an automobile. The system is for use in raising the front right, front left, rear right or rear left portions of an automobile by way of the front or rear axles. The system achieves this through the use of four separate hydraulic jacks, two positioned at either end of the front axle and two positioned at either end of the rear axle. With the system of the present invention a user can raise a single portion of the automobile (eg the front right or front left) or all portions simultaneously.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
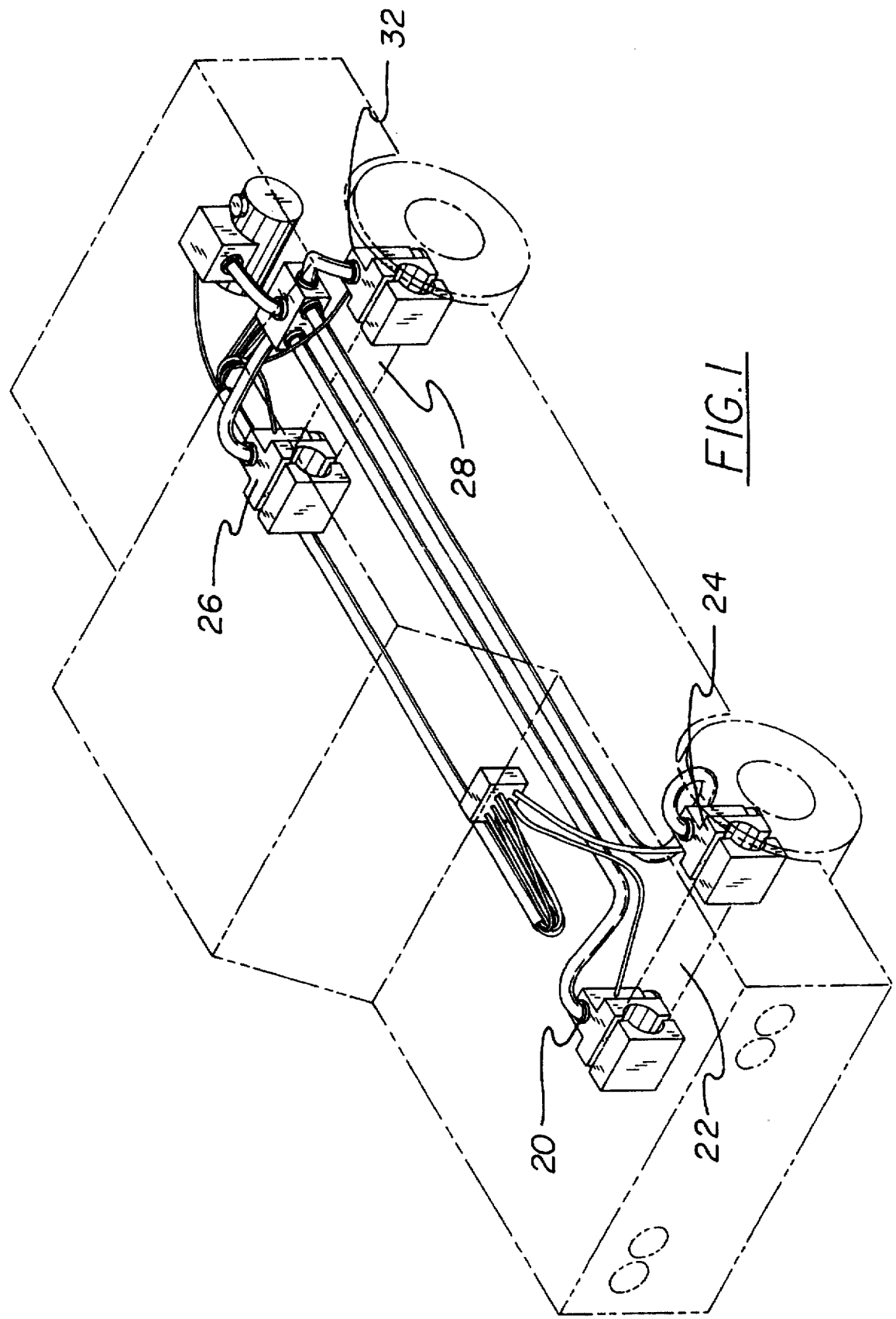
FIG. 1 is a perspective view of the preferred embodiment of the hydraulic jack for vehicle constructed in b accordance with the principles of the present invention.
Figure 2:
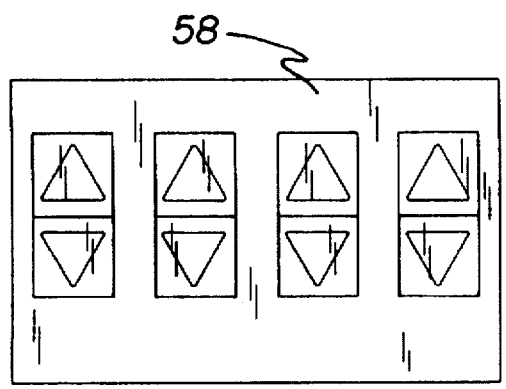
FIG. 2 is a view of the control panel and system of the present invention.
Figure 3:
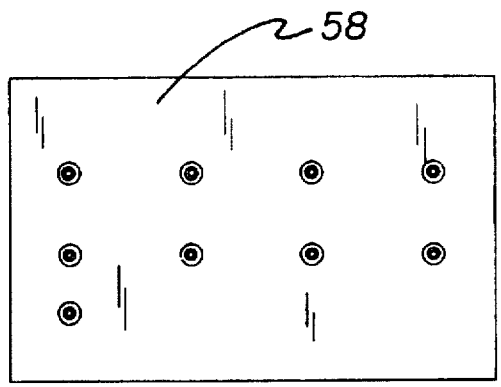
FIG. 3 is a view of an element of the control system of the present invention.
Figure 4:
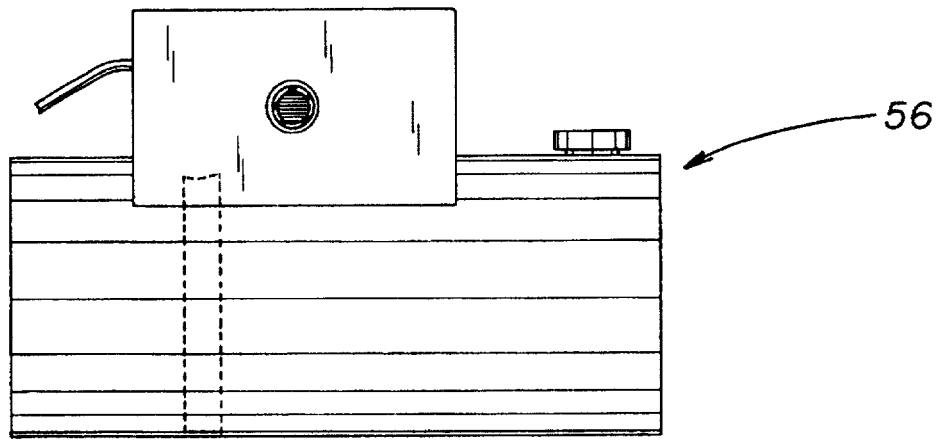
FIG. 4 is a view of the source of working fluid.
Figure 5:
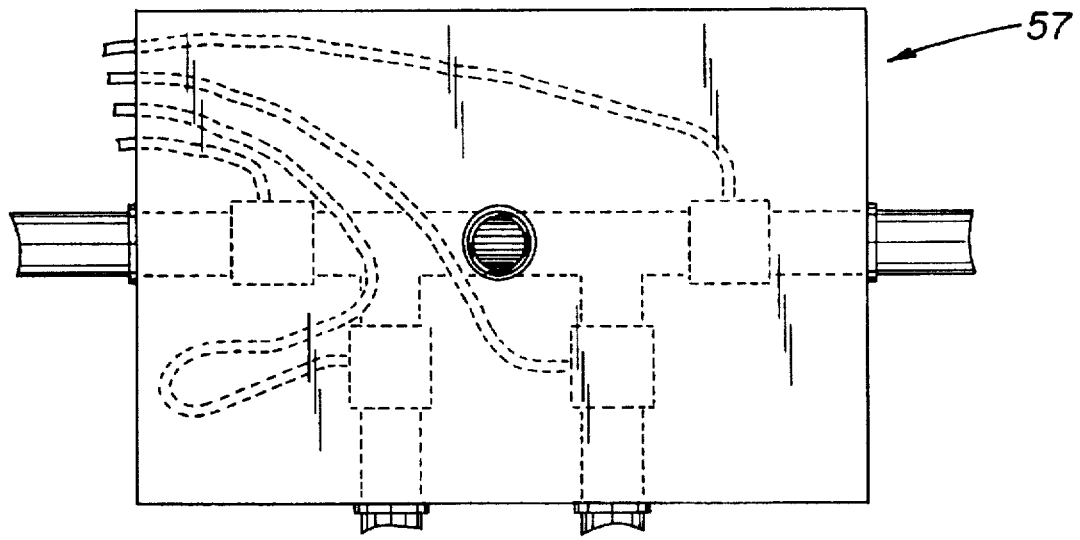
FIG. 5 is a view of the manifold in accordance with the present invention.
Figure 6:
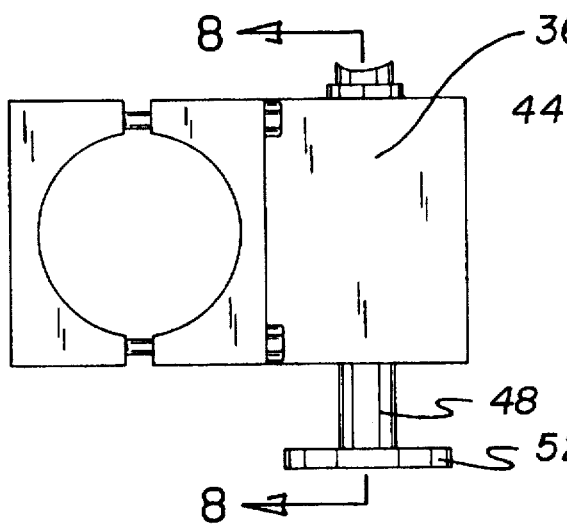
FIG. 6 is a view of one of the jacks of the present invention.
Figure 7:
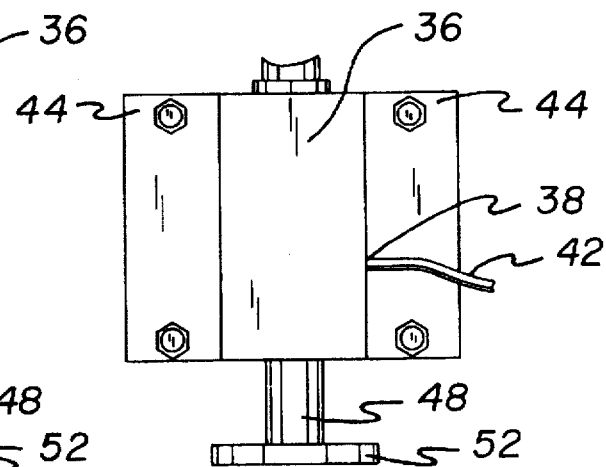
FIG. 7 is a front view of the jack of FIG. 6.
Figure 8:
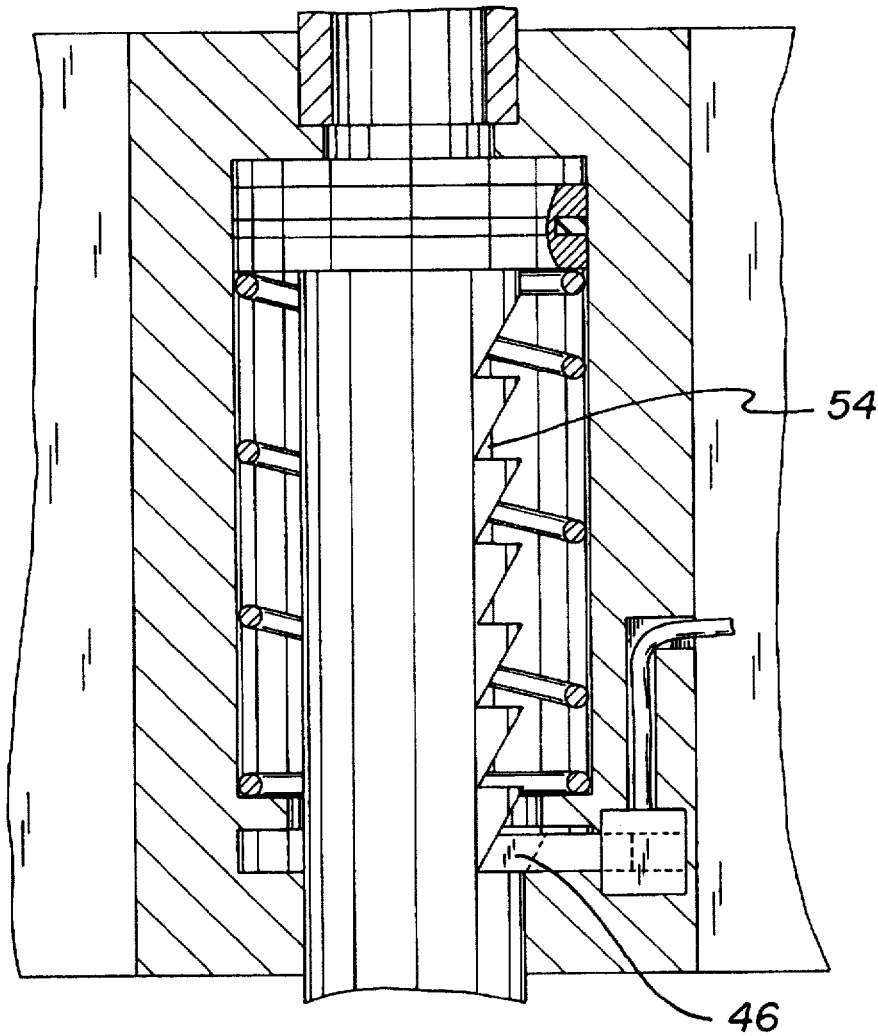
FIG. 8 is a view taken along line 8—8 of FIG. 6.

With reference now to the drawings, and in particular to FIG. 1 thereof, the preferred embodiment of the new and improved hydraulic jack for vehicle embodying the principles and concepts of the present invention and generally designated by the reference numeral 10 will be described.

The present invention relates to a hydraulic jack system operable from the dashboard of an automobile. The system is for use in raising the front right, front left, rear right or rear left portions of an automobile by way of the front or rear axles. The system achieves this through the use of four separate hydraulic jacks, two positioned at either end of the front axle and two positioned at either end of the rear axle. With the system of the present invention a user can raise a single portion of the automobile (eg the front right or front left) or all portions simultaneously. The various components of the present invention, as well as the manner in which they interrelate will be described in greater hereinafter.

As indicated above, the present invention is carried out through the use of four separate hydraulic jacks. More specifically the present invention employs: a front right jack 20 positioned adjacent the front right portion of the automobile upon the front axle 22; a front left jack 24 positioned adjacent the front left portion of the automobile upon the front axle 22; a rear right jack 26 positioned adjacent the rear right portion of the automobile upon the rear axle 28; and a rear left jack 32 positioned adjacent the rear left portion of the automobile upon the rear axle 28. All of these jacks are of identical construction, consequently only one will be described in detail.

Each of the jacks is defined by a cylinder having an interior portion 34 and an exterior surface 36. In order to permit the delivery of hydraulic fluid (or some other working fluid) to the jack, a hydraulic port 38 and an associated hydraulic line 42 are positioned within the cylinder. More specifically, the port is formed within the side of the cylinder and the hydraulic line 42 extends therefrom to a source of hydraulic fluid. Two mounting posts 44 are positioned upon the exterior surface 36 of the cylinder. The function of these mounting posts will be described in greater detail hereinafter. A selectively engagable detent 46 is positioned within the interior portion 34 of the cylinder. This detent 46 can take the form of a linearly movable pawl. Furthermore, the detent 46 can be movable by way of hydraulic fluid. Each of the jacks is further defined by a piston 48 which has an upper extent and a lower extent and an intermediate extent therebetween. A pad 52, which is adapted for engagement with the ground, is positioned upon the lower extent of the piston 48. A number of recesses 54 are formed along the intermediate extent of the piston 48 each of which are adapted to be engaged by the detent 46. Thus, the detent 46 and recesses 54 together function to selectively permit or restrict the motion of the piston 48 with respect to the cylinder. Thus, in operation, delivery of hydraulic fluid into the cylinder forces down upon the piston 48 and thus extends the piston 48 and its associated pad 52. Furthermore, once the piston 48 is extended from the cylinder the detent 46 and recesses 54 together act to positively lock the piston 48 relative to the cylinder.

Each of the jacks is mounted and positioned upon an axle of the automobile by way of the two mounting posts 44 of the cylinder. Of course, the mounting each of the jacks is done in a manner which allows normal operation of the axle. Thus, the mounting posts may be employed in conjunction with a set of screws and a backing plate to enable the jack to be mounted about the axle or an axle component. Alternatively, the two mounting posts 44 can be employed to mount the jack directly upon an axle component providing such mounting does not interfere with the normal operation of the axle.

As described above, each of the jacks includes an associated hydraulic line 42 which is employed in delivering the working fluid to the jack to extend the piston 48. Each of these lines are, in turn, connected to a source of working fluid under pressure 56 by way of a manifold 57. Likewise, hydraulic lines can be provided to each of the jacks for use in controlling the detent 46 mechanism. These lines too would be connected to a source of working fluid under pressure.

With respect to the hydraulic lines 42 for use in extending the piston 48, a control means 58 is provided. This control means 58 takes the form of a control panel which is positioned upon the dashboard of the automobile. The control panel functions to control the application of hydraulic fluid to the front right jack 20, front left jack 24, rear right jack 26 and rear left jack 32. In the preferred embodiment, the control panel includes four sets of buttons: an up/down front right; an up/down front left; an up/down rear right; and an up/down rear left. Each of these control are employed in selectively raisins or lowering a respective piston 48.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A hydraulic jack system operable from the dashboard of an automobile, the system for use in raising the front right, front left, rear right and rear left portions of an automobile by way of the front axle and rear axle, the system comprising in combination:

a front right jack defined by a cylinder having an interior portion and an exterior surface, a hydraulic port and associated hydraulic line positioned within the cylinder, two mounting posts positioned upon the exterior surface of the cylinder, a selectively engagable detent positioned within the interior portion of cylinder, the front right jack further defined by a piston having an upper extent and a lower extent and an intermediate extent therebetween, a pad positioned upon the lower extent of the piston and adapted for engagement with the ground, a number of recesses formed along the intermediate extent of the piston and adapted to be engaged by the detent, the detent and recesses together functioning to selectively permit or restrict the motion of the piston with respect to the cylinder, the front right jack positioned adjacent the front right portion of the automobile upon the front axle, the front right jack being positioned by way of the two mounting posts;

a front left jack defined by a cylinder having an interior portion and an exterior surface, a hydraulic port and associated hydraulic line positioned within the cylinder, two mounting posts positioned upon the exterior surface of the cylinder, a selectively engagable detent positioned within the interior portion of the cylinder, the front left jack further defined by a piston having an upper extent and a lower extent and an intermediate extent therebetween, a pad positioned upon the lower extent of the piston and adapted for engagement with the ground, a number of recesses formed along the intermediate extent of the piston and adapted to be engaged by the detent, the detent and recesses together functioning to selectively permit or restrict the motion of the piston with respect to the cylinder, the front left jack positioned adjacent the front left portion of the automobile upon the front axle, the front left jack being positioned by way of the two mounting posts;

a rear right jack defined by a cylinder having an interior portion and an exterior surface, a hydraulic port and associated hydraulic line positioned within the cylinder, two mounting posts positioned upon the exterior surface of the cylinder, a selectively engagable detent positioned within the interior portion of the cylinder, the rear right jack further defined by a piston having an upper extent and a lower extent and an intermediate extent therebetween, a pad positioned upon the lower extent of the piston and adapted for engagement with the ground, a number of recesses formed along the intermediate extent of the piston and adapted to be engaged by the detent, the detent and recesses together functioning to selectively permit or restrict the motion of the piston with respect to the cylinder, the rear right jack positioned adjacent the rear right portion of the automobile upon the rear axle, the rear right jack being positioned by way of the two mounting posts;

a rear left jack defined by a cylinder having an interior portion and an exterior surface, a hydraulic port and associated hydraulic line positioned within the cylinder, two mounting posts positioned upon the exterior surface of the cylinder, a selectively engagable detent positioned within the interior portion of the cylinder, the rear left jack further defined by a piston having an upper extent and a lower extent and an intermediate extent therebetween, a pad positioned upon the lower extent of the piston and adapted for engagement with the ground a number of recesses formed along the intermediate extent of the piston and adapted to be engaged by the detent, the detent and recesses together functioning to selectively permit or restrict the motion of the piston with respect to the cylinder, the rear left jack positioned adjacent the rear left portion of the automobile upon the rear axle, the rear left jack being positioned by way of the two mounting posts;

a control panel positioned upon the dashboard of the automobile, the control panel functioning to control the application of hydraulic fluid to the front right jack, front left jack, rear right jack and rear left jack the control panel in controlling the application of hydraulic fluid to each of the jacks also controlling the application of hydraulic fluid to each of the detents of the jacks.

* * * * *